No. 765,692. PATENTED JULY 26, 1904.
G. W. VOELKER.
ROTARY CLOTH PRESSING MACHINE.
APPLICATION FILED DEC. 5, 1903.
NO MODEL.

Witnesses
Edward H. Carr
Annie E. Ratcliffe

Inventor
George W. Voelker
By Wm. R. Tillinghast
Attorney

No. 765,692. Patented July 26, 1904.

UNITED STATES PATENT OFFICE.

GEORGE W. VOELKER, OF WOONSOCKET, RHODE ISLAND.

ROTARY CLOTH-PRESSING MACHINE.

SPECIFICATION forming part of Letters Patent No. 765,692, dated July 26, 1904.

Application filed December 5, 1903. Serial No. 183,904. (No model.)

*To all whom it may concern:*

Be it known that I, GEORGE W. VOELKER, a citizen of the United States, residing in the city of Woonsocket, county of Providence, and State of Rhode Island, have invented a new and useful Improvement in Rotary Cloth-Pressing Machines, of which the following is a description.

It is frequently advantageous in pressing cloth in these rotary presses to give it a lighter pressure, and consequently a different and softer finish, than the machine as heretofore constructed will do; and the object of my invention is to make this possible; and it consists in attachments to be added to rotary cloth-presses similar to those described and shown in former United States Patents granted to me—viz., No. 443,700, of December 30, 1890; No. 445,723, of February 3, 1891; No. 453,028, of May 26, 1891.

Figure 1:
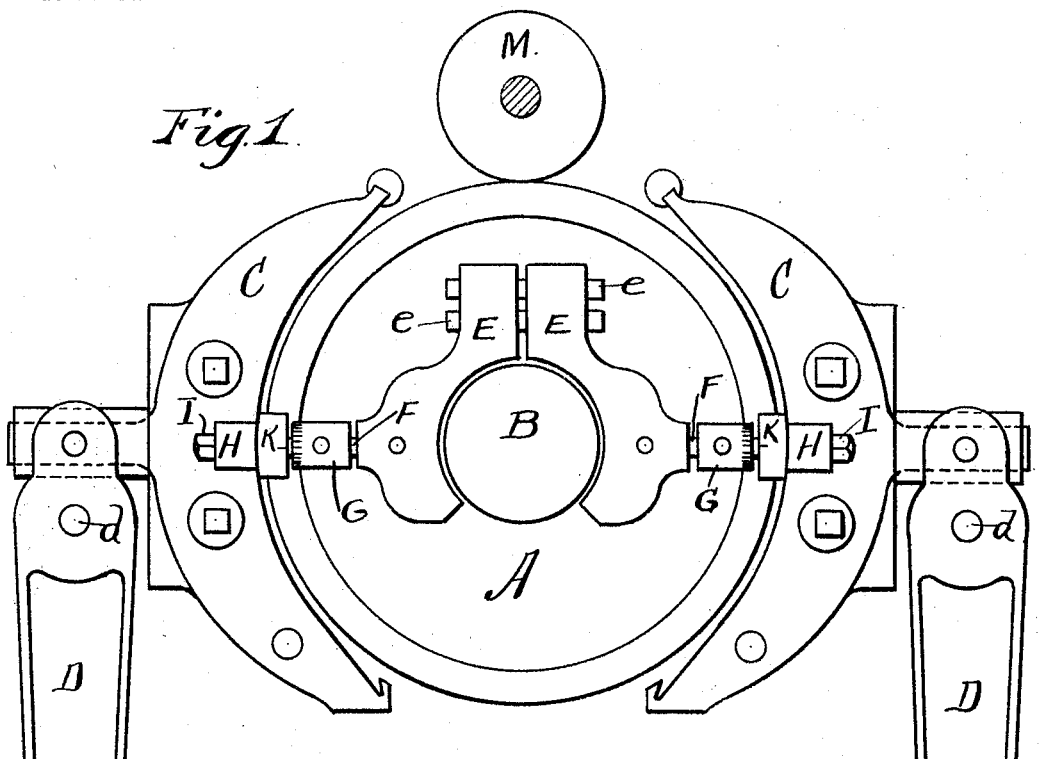
Figure 2:
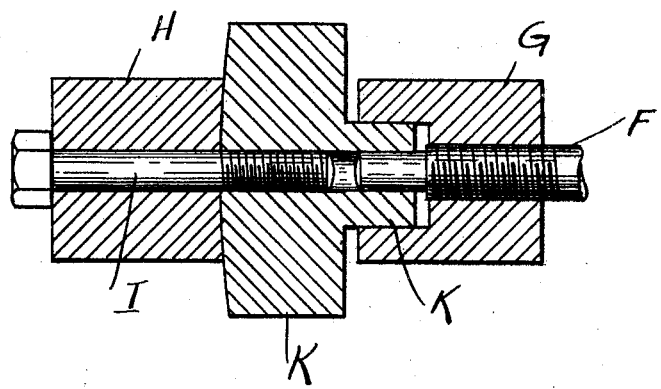

In the drawings, Figure 1 is an end view of the roll and connecting parts of a cloth-pressing machine with my present invention attached; and Fig. 2, a cross-section of a portion of my invention, as more fully hereinafter described.

My press as heretofore constructed consists of the hollow pressing-roll A, rotating upon its axle B in horizontal bearings and having hollow bed or press plates C C on either side of the roll. These beds or press-plates are pressed against the roll or withdrawn from them by means of the vertical levers D D, pivoted near their upper ends at *d d* to the frame of the machine and operated by toggle-links (not shown) between their lower ends.

To prevent the beds from coming too near the roll, and thereby pressing the cloth more than is always desirable, and yet at the same time to permit the press to be readily opened for the insertion of a new piece of cloth, I place upon the axle or bearing of the roll a collar partially surrounding the axle and made in two pieces, (shown as E E in Fig. 1.) Rods *e e* pass through the upper extensions of the two portions of the collar and are made rigid in one portion by set-screws, while the other portion is free to move upon them and by reason of the slight space between the two portions take up any wear upon the inside of the collar, so that it will always press closely upon either side of the axle B. Inserted and fastened in each portion of the collar are screw-threaded rods F F, upon each of which is screwed nuts G G. These nuts (see Fig. 2) are made with a recess *g g* in their outer ends, and the ends of the screw-rods F F extend outward through these recesses, and that portion of them is preferably left unthreaded. Upon each of the beds there is a lug H H, made integral with its bed, and bolts I I pass through each of these lugs, with a lock-nut K K on their ends, the bolts I I being made so that they will not pass wholly through the nuts. Each of the nuts K K is made with a projection *k* to enter the recesses in the ends of the nuts G G and is also made with a hole or recess within the projection to receive the end of the corresponding rod F. These lock-nuts K K are screwed up tightly upon the bolts I I.

To set the bed-plates so that they will not press too tightly upon the roll A, the nuts G G are turned upon the threads of the screw-rods F F so as to come into contact with the lock-nuts K K just before the bed-plates come into contact with the roll. The required adjustment is very slight, and the threads upon the rods F F are therefore preferably cut fine, and the nuts G G are marked with horizontal numbered lines upon their circumference, which, with a fixed line upon the lock-nuts K K, will serve as a micrometer screw and guide. As the screw-rods F F, with their nuts G G, are entirely separate from the lugs H H and lock-nuts K K, the press may be readily opened the required distance for inserting new pieces of cloth, &c.

It is to be understood that the collars and lugs and their connections and intervening parts are duplicated at the other end of the press and roller.

Many of the details of the device can be varied and some could be omitted without departing from the spirit of my invention. Thus the bolts I I and the lock-nuts K K might be omitted and the lugs H H shaped as the lock-nuts, and the special shapes of these lock-nuts and the nuts G G are rather advantageous than necessary.

It is frequently necessary when light pressure is given to the cloth to provide means for drawing it through the press, and in such cases I provide a take-up roll upon the top of the press-roll, so that the cloth is wound upon it by running in contact with the press-roll. Such a roll is shown at M in Fig. 1.

I claim as my invention—

1. In a cloth-pressing machine the combination with a press-roll and press-plates movable toward and from the roll, of a collar made in two parts as described, each of which parts bears upon the axle of the roll and has a screw-rod extending therefrom, and nuts adjustable upon the screws to bear against the press-plates and prevent the latter from coming into contact with the press-roll, substantially as described.

2. In a cloth-pressing machine the combination with a press-roll and press-plates movable toward and from the roll, of a collar made in two parts as described, each of which parts bears upon the axle of the roll and has a screw-rod extending therefrom, nuts adjustable upon the screws with recesses upon their surfaces, and lugs upon the press-plates having projections to enter the recesses in the nuts, substantially as and for the purpose described.

3. In a cloth-pressing machine the combination with a press-roll and press-plates movable toward and from the roll, of a collar made in two parts as described, each of which parts bears upon the axle of the roll and has a screw-rod extending therefrom, nuts adjustable upon the screws to bear against the press-plates and preventing the latter from coming into contact with the roll, and a take-up roll for the fabric passing through the press running in contact with the press-roll, substantially as described.

GEO. W. VOELKER.

Witnesses:
ANNIE E. RATCLIFFE,
WM. R. TILLINGHAST.